United States Patent
Fielder, III et al.

(10) Patent No.: US 9,938,807 B2
(45) Date of Patent: Apr. 10, 2018

(54) TORSION CLAMP

(71) Applicant: ESP COMPLETION TECHNOLOGIES L.L.C., Missouri City, TX (US)

(72) Inventors: Robert P. Fielder, III, Houston, TX (US); Lance I. Fielder, Sugar Land, TX (US)

(73) Assignee: ESP COMPLETION TECHNOLOGIES L.L.C., Missouri City, TX (US)

( * ) Notice: Subject to any disclaimer, the term of this patent is extended or adjusted under 35 U.S.C. 154(b) by 0 days.

(21) Appl. No.: 15/294,932

(22) Filed: Oct. 17, 2016

(65) Prior Publication Data

US 2017/0030172 A1  Feb. 2, 2017

Related U.S. Application Data

(62) Division of application No. 13/927,178, filed on Jun. 26, 2013, now Pat. No. 9,470,072.

(60) Provisional application No. 61/790,035, filed on Mar. 15, 2013, provisional application No. 61/665,559, filed on Jun. 28, 2012.

(51) Int. Cl.
*E21B 43/12* (2006.01)
*F16L 41/02* (2006.01)

(52) U.S. Cl.
CPC ............ *E21B 43/128* (2013.01); *E21B 43/12* (2013.01); *F16L 41/023* (2013.01)

(58) Field of Classification Search
CPC ....... E21B 43/128; E21B 43/12; F16L 41/023
See application file for complete search history.

(56) References Cited

U.S. PATENT DOCUMENTS

| | | | |
|---|---|---|---|
| 1,238,165 | A | 8/1917 | Lynn |
| 2,176,375 | A | 10/1939 | McClinton |
| 2,745,497 | A | 5/1956 | Dale et al. |
| 4,062,551 | A | 12/1977 | Base |
| 4,128,735 | A | 12/1978 | Zehren |
| 4,595,061 | A | 6/1986 | Underwood |
| 4,603,578 | A | 8/1986 | Stoltz |
| 4,892,337 | A | 1/1990 | Gunderson et al. |
| 5,213,159 | A | 5/1993 | Schneider |
| 5,709,416 | A | 1/1998 | Wood |
| 6,168,388 | B1 | 1/2001 | Hughes et al. |
| 6,250,390 | B1 | 6/2001 | Narvaez et al. |
| 6,325,143 | B1 | 12/2001 | Scarsdale |
| 7,055,865 | B2 | 6/2006 | Riordan, III et al. |
| 7,131,497 | B2 | 11/2006 | Helms et al. |

(Continued)

FOREIGN PATENT DOCUMENTS

| | | |
|---|---|---|
| GB | 2288197 A | 10/1995 |
| GB | 2395500 A | 5/2004 |

(Continued)

*Primary Examiner* — Michael R Wills, III
(74) *Attorney, Agent, or Firm* — Patterson & Sheridan, L.L.P.

(57) ABSTRACT

An artificial lift system for use in a wellbore comprising a torsion clamp connected to an electric submersible pump. The torsion clamp comprises a mandrel, a splined sleeve, a stop, a bypass sleeve, and an adjustable bracket. The mandrel has splines that mesh with splines formed on the sleeve. The mandrel also has a coupling that connects to a coupling of the stop. The adjustable bracket is configured to connect the bypass sleeve to the splined sleeve.

3 Claims, 7 Drawing Sheets

(56) References Cited

U.S. PATENT DOCUMENTS

| | | |
|---|---|---|
| 7,464,755 B2 | 12/2008 | Edwards |
| 2008/0135239 A1 | 6/2008 | Edwards |
| 2013/0277064 A1 | 10/2013 | Xiao et al. |

FOREIGN PATENT DOCUMENTS

| | | |
|---|---|---|
| WO | 02/075111 A1 | 9/2002 |
| WO | 2012164515 A2 | 12/2012 |

TORSION CLAMP

CROSS REFERENCE TO RELATED APPLICATIONS

This application is a divisional of U.S. patent application Ser. No. 13/927,178, filed Jun. 26, 2013, which claims benefit of U.S. Provisional Patent Application No. 61/790,035, filed Mar. 15, 2013, and also claims benefit of U.S. Provisional Patent Application No. 61/665,559, filed Jun. 28, 1012, the contents of which are herein incorporated by reference in their entirety.

BACKGROUND OF THE DISCLOSURE

Field of the Disclosure

Embodiments of the present disclosure generally relate to a downhole modular Y-tool.

Description of the Related Art

Oil wells usually have an outer casing down which is lowered a production string for the passage to the surface of the oil produced by the well. In certain wells it is necessary to have an artificial lift system to bring oil to the surface usually up the production tubing, either because of the lack of sufficient natural reservoir pressure to produce the well or to enhance production from a well that produces under natural pressure. A common system of artificial lift is to place an electrical submersible pump (ESP) down the well casing on the end of the production tubing to pump fluid from the casing up the production tubing. The installation of an ESP on the end of the production tubing eliminates the possibility of carrying out logging or other operations in the well below the production tubing with tools.

SUMMARY OF THE DISCLOSURE

Embodiments of the present disclosure generally relate to a downhole modular Y-tool. In one embodiment, a Y-tool for use in a wellbore includes: a stem having a bore formed therethrough, a port formed through a wall thereof, and a coupling formed at each end thereof; a branch fastened to the stem and having a passage formed therethrough in fluid communication with the stem port and a coupling formed at an end thereof; and a gasket sealing an interface of the stem port and branch passage.

In another embodiment, a torsion clamp for use in a wellbore includes a mandrel. The mandrel has a coupling formed at each end thereof and splines formed along an outer surface of the mandrel and extending between the couplings. The torsion clamp further includes: a sleeve having splines formed in an inner surface thereof for meshing with the mandrel splines; a stop having a coupling for connection with one of the mandrel couplings; a bypass sleeve having couplings formed at each end thereof; and an adjustable bracket for connecting the bypass sleeve to the splined sleeve.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
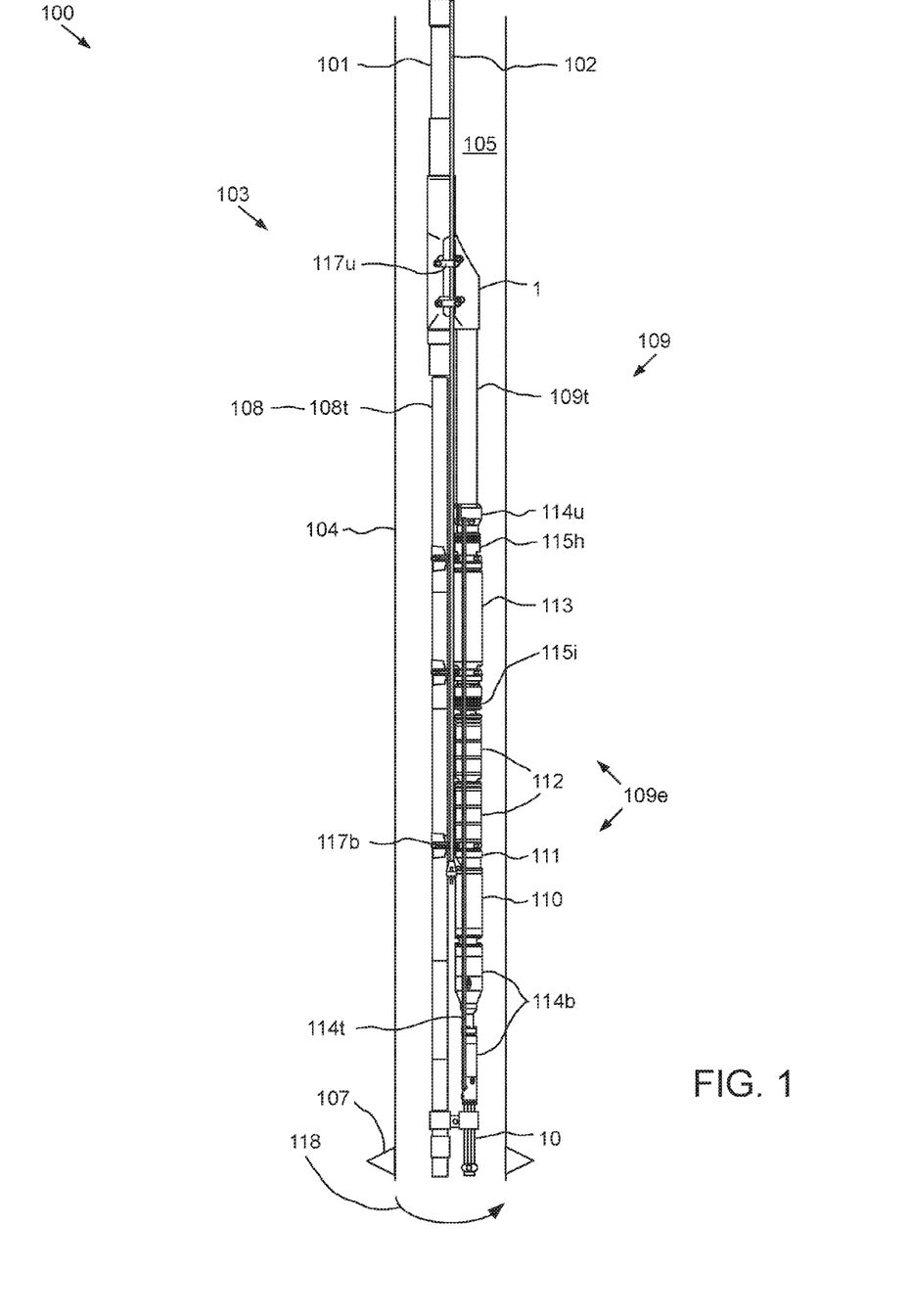
FIG. 1 illustrates an artificial lift system (ALS), according to one embodiment of the present disclosure.
Figure 2A:
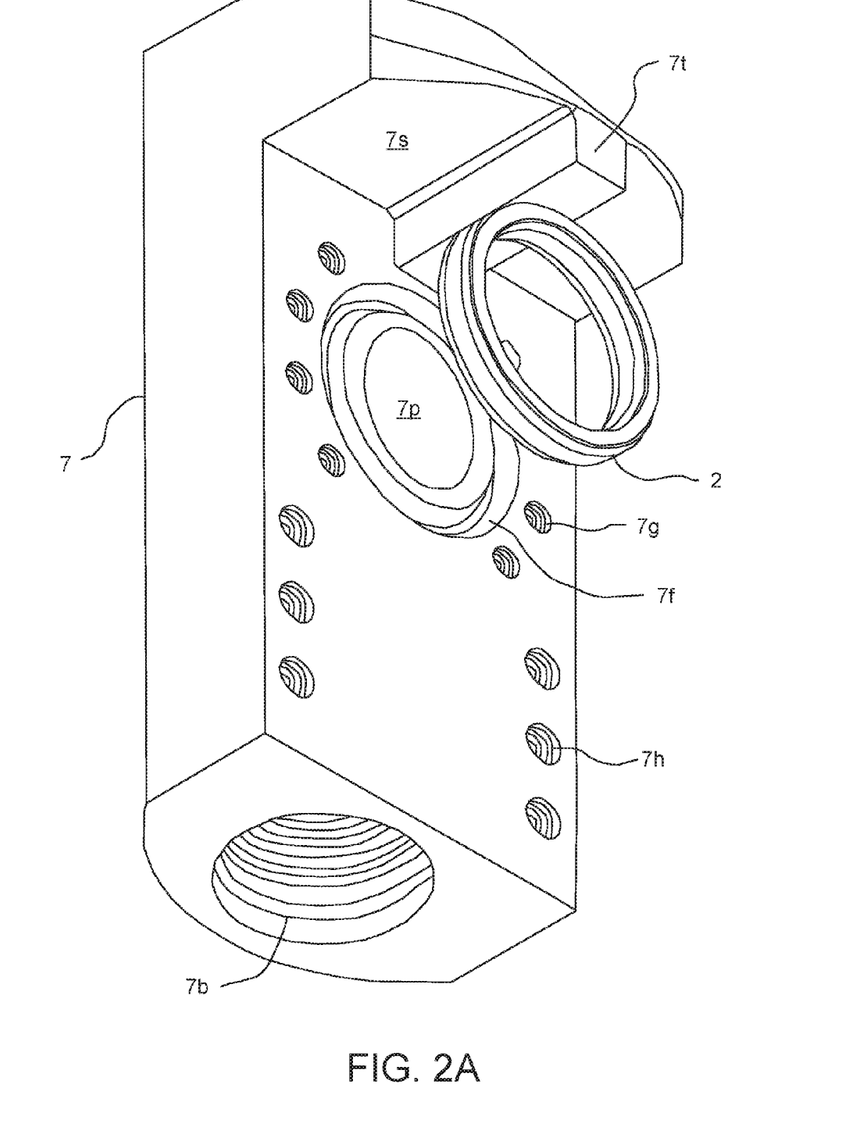
FIGS. 2A-2D illustrate a downhole modular Y-tool of the ALS.
Figure 2B:
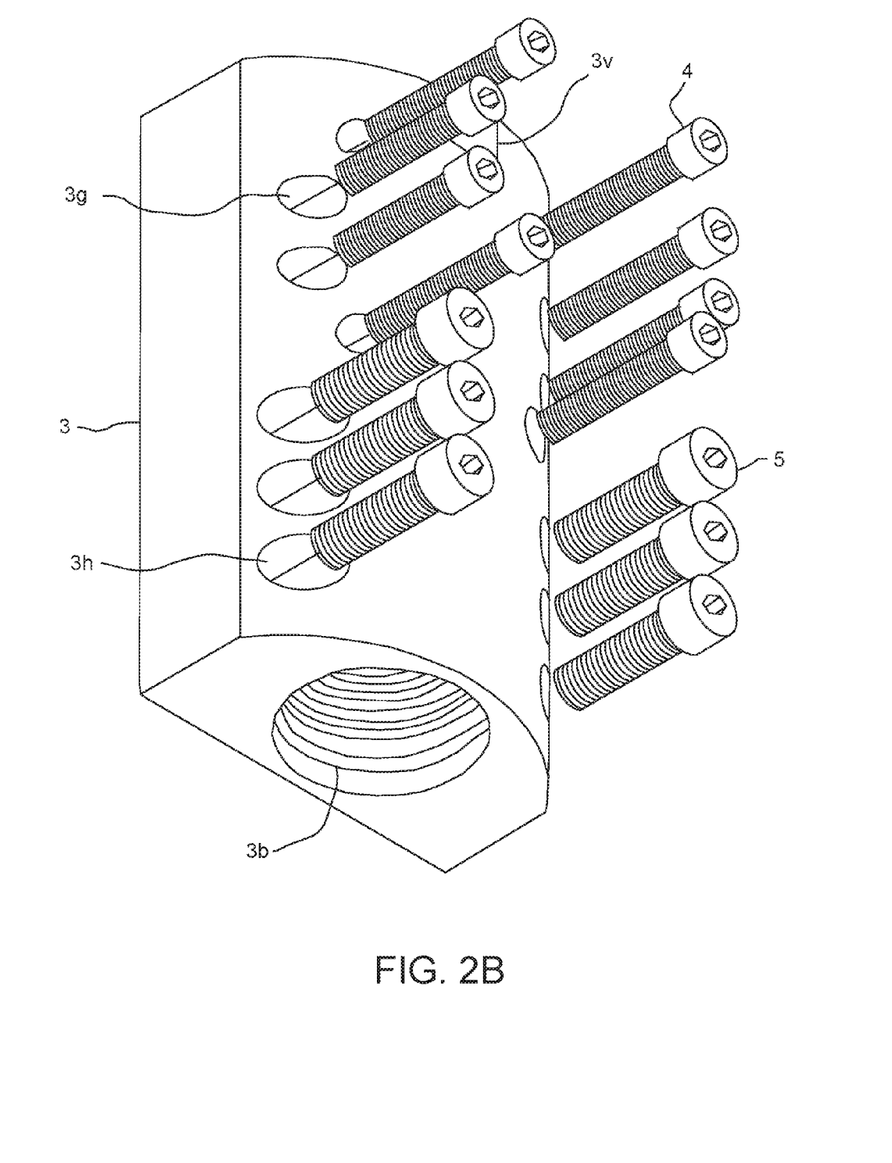
Figure 2C:
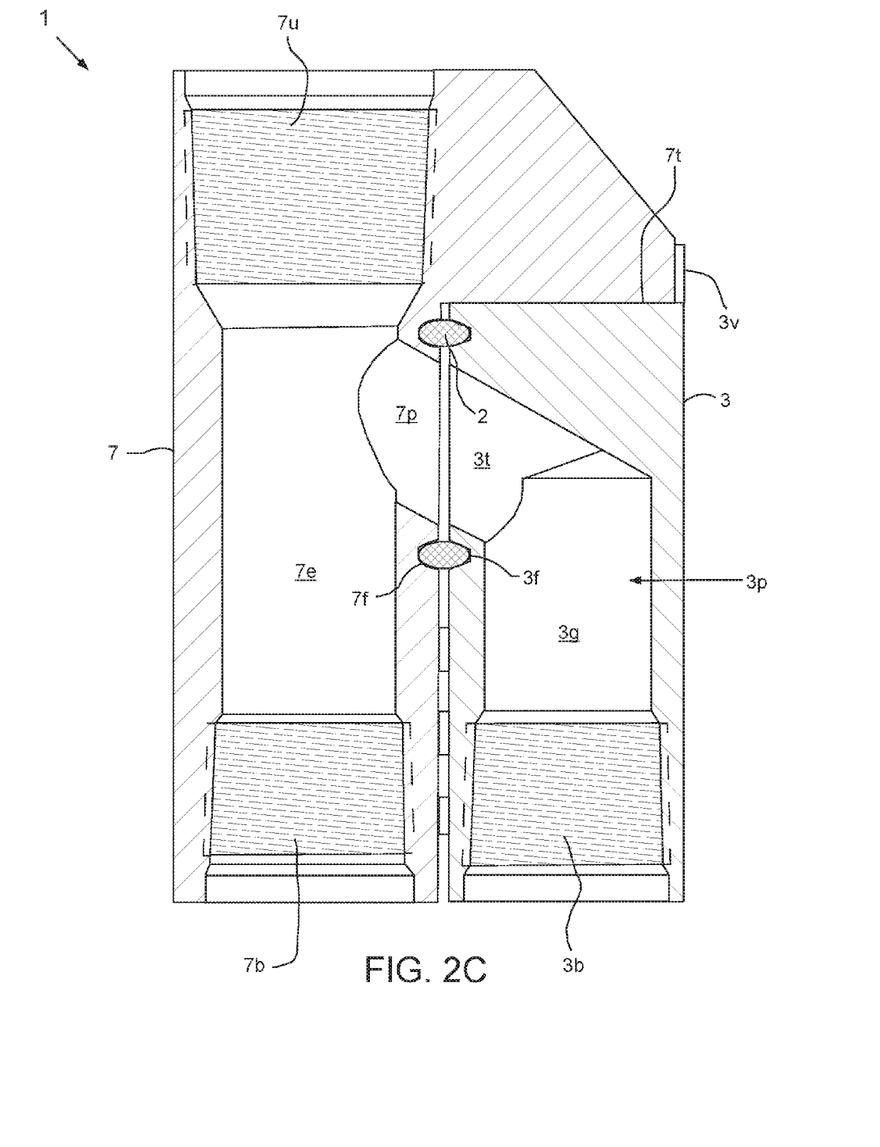
Figure 2D:
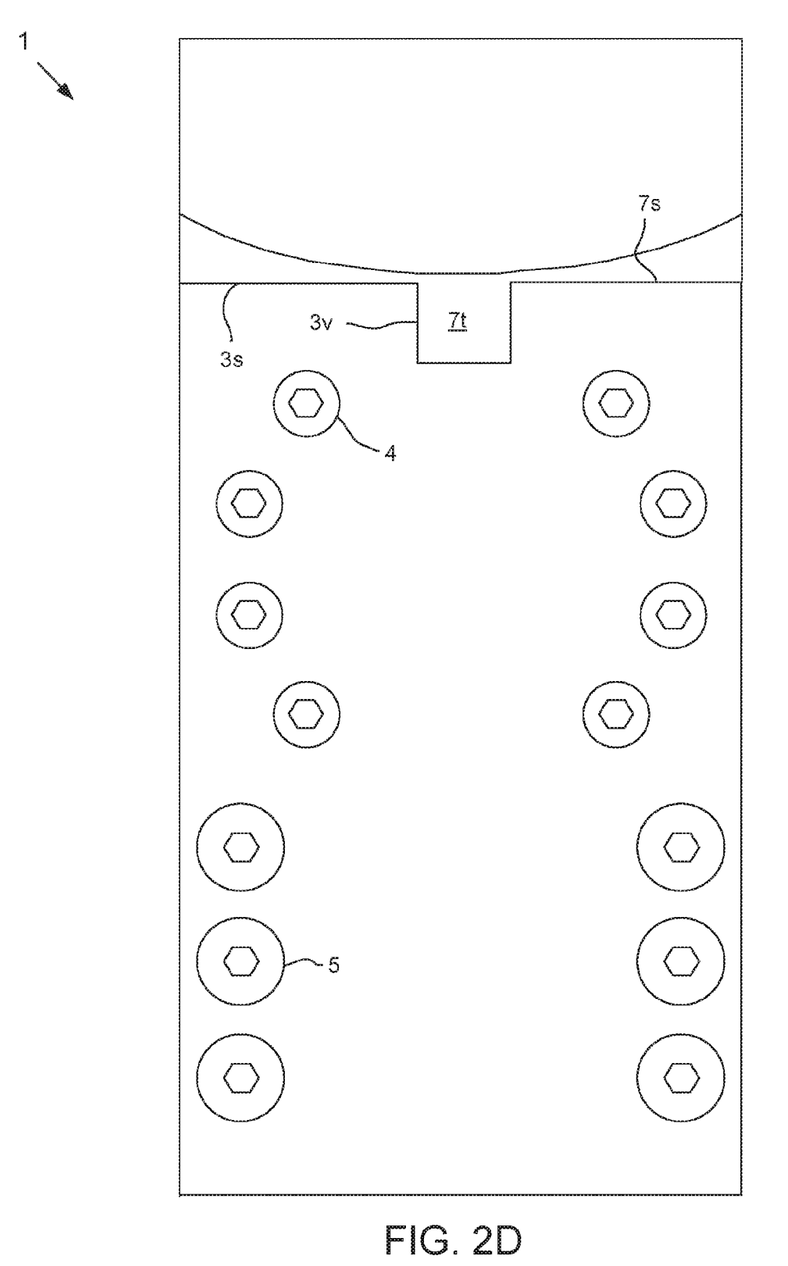

FIG. 1 illustrates an artificial lift system (ALS) 100, according to one embodiment of the present disclosure. The ALS 100 may include a motor driver (not shown), a production string 101, a power cable 102, and a downhole assembly 103. The production string 101 may include joints of production tubing interconnected, such as by threaded couplings, or coiled tubing.

The downhole assembly 103 may be suspended from the production string 101 disposed in a cased 104 wellbore 105 that extends from a surface (not shown) of the earth, through a non-productive formation (not shown), and penetrates a productive formation having a productive zone. The casing 104 may be perforated 107 adjacent to the productive zone to provide fluid communication between the zone and the casing bore. As shown, the wellbore 105 may be vertical. Alternatively, the wellbore 105 may be deviated, such as diagonal or horizontal.

The downhole assembly 103 may include a Y-tool 1, a bypass string 108, and a pump string 109. The pump string 109 may include a spacer tube 109t extending from the Y-tool 1 to the productive zone, an ESP 109e connected to a bottom of the spacer tube adjacent to the perforations 107, and a first portion of a torsion clamp 10 connected to a lower end of the ESP. The bypass string 108 may include joints of tubing 108t and a second portion 14 (FIG. 3A) of the torsion clamp 10 interconnected, such as by threaded couplings. The bypass string 108 may extend from the Y-tool 1 to a depth below the ESP 109e for facilitating insertion of tools through the production tubing string 101 pass the ESP, such as for a logging operation.

Alternatively, the bypass string may instead be a second pump string having a second ESP assembled as part thereof, as discussed and illustrated at FIGS. 2-6 of U.S. Prov. Pat. App. No. 61/665,559, filed Jun. 28, 2012, which is herein incorporated by reference in its entirety. Alternatively, a fluid injection tube may also extend along the production string 101, through which one or more chemicals, such as corrosion inhibitor, may be injected.

The ESP 109e may include a submersible electric motor 110, a pothead 111, a motor protector 112, a pump 113, one or more sensor units, such as an upper unit 114u and a lower unit 114b, connected by a capillary tube 114t, an intake 115i, and a discharge head 115h. Housings of the ESP components may be connected, such as by flanges and fasteners and/or threaded couplings, and shafts of each applicable component may be connected, such as by splined couplings.

The power cable 102 may be a three phase cable extending from the motor driver at the surface to the pothead 111. The power cable 102 may be fastened to the downhole assembly 103, such as by clamps 117u,b.

The motor 110 may be an induction motor. The motor 110 may be filled with a dielectric, thermally conductive liquid lubricant, such as motor oil. In operation, the motor 110 may rotate the motor shaft, thereby driving the pump shaft. The induction motor may be a two-pole, three-phase, squirrelcage type and have a wound rotor and stator. Alternatively, the motor may be a permanent magnet motor, such as a brushless DC motor, or a switched reluctance motor.

The intake 115$i$ may include a plurality of ports formed through the pump housing for allowing production fluid (not shown), such as crude oil, to enter a lower or first stage of the pump 113 and a screen to filter particulates from the production fluid. Alternatively, the intake 115$i$ may include a static gas separator or rotary gas separator depending on the gas content of the production fluid.

The pump 113 may be centrifugal, such as a radial flow or mixed axial/radial flow centrifugal pump. The pump 113 may include one or more stages. Each stage may include an impeller and a diffuser. Each impeller may be longitudinally and torsionally connected to the pump shaft and each diffuser may be longitudinally and torsionally connected to the pump housing. Rotation of each impeller by the pump shaft may impart velocity to the production fluid and flow through the stationary diffuser may convert a portion of the velocity into pressure. The pump 113 may deliver the production fluid to the production string 101 via the discharge head 115$h$.

The motor protector 112 may isolate the production fluid being pumped through the pump 113 from the motor oil by equalizing the lubricant pressure with the pressure of the production fluid. The motor protector 112 may include a mechanical seal, an elastic fluid-barrier bag, or a labyrinth of tube paths extending between a lubricant chamber and a pumping chamber providing limited fluid communication between the chambers. The motor protector 112 may also include a thrust bearing capable of supporting thrust load from the pump 113.

The lower sensor sub 114$b$ may include a variety of sensors for monitoring operation of the ESP 109$e$, such as pressure sensors (intake and discharge), temperature sensors, and/or vibration sensors. The lower sensor sub 114$b$ may further include a transmitter in communication with the power cable 102 for transmitting the sensor measurements to the surface. The upper sensor sub 114$u$ may provide fluid communication between the discharge head 115$h$ and the capillary tube 114$t$ for measurement of the discharge pressure by the lower sensor sub 114$b$.

FIGS. 2A-2D illustrate a downhole modular Y-tool 1, according to one embodiment of the present disclosure. The Y-tool 1 may include a body having two or more sections, such as a stem 7 and a branch 3. The body may have an oblong cylindrical shape. The stem 7 may have a bore 7$e$ formed therethrough and a port 7$p$ formed through a wall thereof. The stem 7 may also have threaded couplings 7$u,b$ formed at each longitudinal end thereof for connection to a lower end of the production string 101 at an upper end of the stem and for connection to an upper end of the bypass string 108 at a lower end of the stem. The branch 3 may have a passage 3$p$ formed therethrough. The branch passage 3$p$ may have a longitudinal portion 3$g$ and a transverse portion 3$t$. The branch 3 may have a threaded coupling 3$b$ formed at a lower end thereof for connection to an upper end of the spacer tube 109$t$. An interface of the stem port 7$p$ and branch passage 3$p$ may be sealed by a gasket 2, such as a modified ring tool joint (RTJ) type, disposed in complementary grooves 7$f$, 3$f$, each formed in a mating face of the respective stem 7 and branch 3. When the stem 7 and branch 3 are connected, the stem port 7$p$ and branch passage 3$p$ may be in fluid communication.

The stem 7 may have one or more sets of one or more threaded sockets 7$g,h$ formed in the mating face thereof and the branch 3 may one or more sets of one or more complementary holes 3$g,h$ formed through a wall thereof or vice versa. The stem 7 and branch 3 may be fastened together, such as by one or more sets of one or more threaded fasteners 4, 5 inserted through the respective holes 3$g,h$ and screwed into the respective sockets 7$g,h$. The stem 7 and branch 3 may also be connected by mating profiles, such as a tongue 7$t$ and groove 3$v$ (shown) or dovetail (not shown). Each profile may be formed in a respective mounting shoulder 3$s$, 7$s$.

Each of the stem 7 and branch 3 may be made from a metal or alloy, such as steel, stainless steel, nickel based alloy, titanium (or alloy thereof). The steel may be plain carbon, low alloy, or high alloy. The stainless steel may be austenitic or duplex. The stem 7 and branch 3 may be made from the same material or different materials. The gasket 2 may be made from a metal or alloy, such as stainless steel. Each of the stem 7 and branch 3 may be manufactured from bar stock (aka billet) using a CNC machine tool, such as a mill.

Once machined, the stem 7 and branch 3 may or may not be surface treated, such as internal and/or external treatment. Such treatment may include a metallic coating, chemical conversion coating, ceramic or cermet coating, polymer coating, coating, and multi-layer combinations thereof.

The metallic coating may be any metal or alloy anodic to the stem/branch alloy or chromium, nickel, or chromium over nickel. If the stem/branch alloy is steel, examples of such anodic coatings are magnesium, zinc, beryllium, aluminum, cadmium, and alloy thereof. The metallic coating may be applied by processes, such as cladding, electroplating, electroless plating, diffusion, metallizing (i.e. arc and flame spraying), high-velocity (oxy-fuel) spray coating, plasma vapor deposition, chemical vapor deposition, and weld overlaying.

Examples of the chemical conversion coating for a steel stem/branch are a phosphating process, an oxidizing process, and a chromate surface conversion. Examples of the ceramic or cermet coating are inorganic zinc silicate, carbide, or organic zinc. The ceramic or cermet coatings may be applied by high-velocity (oxy-fuel) spray coating or flame spray coating, or arc spray coating.

Examples of the polymer coating are epoxy, acrylic, polyurethane, phenolic, epoxy-phenolic, fluorocarbon based, molybdenum disulfide, and silicone. The epoxy, acrylic, polyurethane, organic zinc, and silicone coatings may each also include a carrier component so that when the two are mixed a chemical reaction occurs which assists in the curing and/or drying cycles. The phenolic, epoxy-phenolic, fluorocarbon based, molybdenum disulfide, and silicon coatings may be applied and then heat cured to set.

An example of a multi-layer combination coating is a first metallic layer, such as an anodic metal or alloy layer, such as zinc, and a second organic layer, such as polyurethane.

Alternatively, the Y-tool 1 may further include a flow control device, such as a rupture disc or valve (i.e. check valve). The flow control device may be mounted in the branch 3 and/or stem 7 as an insert. Alternatively, the Y-tool 1 may have profile, such as a groove formed in an outer surface of the stem 7 and/or branch 3 for accommodating passage of a conduit, such as a capillary tube, cable, and/or flat pack umbilical.

Advantageously, the Y-tool 1 may facilitate the deployment of the downhole assembly 103 for the usage of reservoir logging instruments while pumping the production fluid with the ESP 109$e$. The Y-tool 1 may be manufactured from various alloys using bar stock versus a cast body of prior art Y-tools, thereby facilitating customization of the metallurgy to the production fluid corrosive and abrasive properties. The Y-tool 1 may also facilitate adaptation to different production string and/or bypass string threads by replacement of the stem 7 (without having to replace the branch 3). The Y-tool 1 may also facilitate adaptation to different pump string threads by replacement of the stem 3 (without having to replace the stem 7).

Advantageously, the Y-tool 1 may be field repairable. The Y-tool 1 may also facilitate repair of a damaged (i.e., corroded, eroded, or abraded) portion by allowing the replacement of only the damaged portion. Advantageously, use of the gasket 2 and fasteners 4, 5 to seal and connect the stem 7 and the branch 3 may enhance seal integrity and eliminate potential metal fatigue and/or internal erosion issues often found in prior art cast type Y-Tool.

Advantageously, the Y-tool 1 may facilitate surface treatment (as discussed above) by allowing the stem 7 and branch 3 to be treated separately. The enhanced coating options may improve fluid flow performance and/or enhance tool life in abrasive and/or corrosive environments. The modular design may also allow for internal modifications for options such as flow control and recirculation devices for additional fluid flow to the ESP motor base. The modular design may also allow for custom Y-Tool dimensional sizing for special heavy walled casing applications where the prior art cast type Y-Tool bodies which do not have the mechanical properties to allow the size reductions.

Figure 3A:
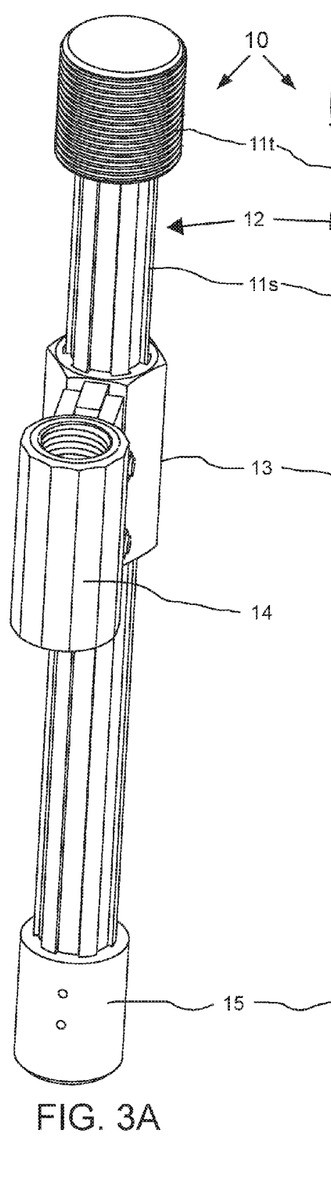
FIGS. 3A and 3B illustrate a torsion clamp of the ALS.
Figure 3B:
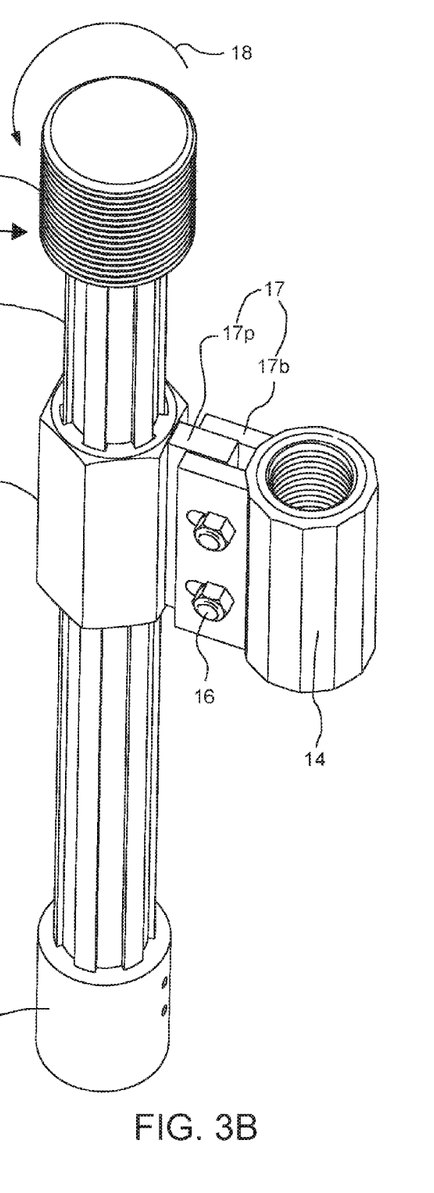

FIGS. 3A and 3B illustrate the torsion clamp 10. The torsion clamp 10 may include a mandrel 12, a splined sleeve 13, a bypass sleeve 14, a stop 15, and a bracket 17. The mandrel 12 may be a rod having a threaded coupling lit formed at an upper end thereof for connection to a lower end of the lower sensor sub 114b and a threaded coupling (not shown) formed at a lower end thereof for connection to the stop 15. The mandrel-stop connection may be secured by one or more set screws. The upper mandrel thread 11t may be configured to tighten in response to counterclockwise rotation 18 of the mandrel 12 relative to the lower sensor sub 114b. A torsional profile, such as splines 11s, may be formed in along an outer surface of the mandrel 12 and extend between the threaded couplings 11t. The splined sleeve 13 may have splines formed in an inner surface thereof complementary to the splines 11s. The splined sleeve 13 may be disposed around the mandrel 12 and engagement of the mandrel splines 11s with the sleeve spines may torsionally connect the sleeve 13 to the mandrel 12 while allowing the splined sleeve to move longitudinally relative thereto.

The bypass sleeve 14 may have a threaded coupling formed at each longitudinal end thereof for assembly with the bypass tubing 108t. The bracket 17 may include a plate 17p connected to the splined sleeve 13, such as by welding, and a pair of plates 17b connected to the bypass sleeve 14, such as by welding. The plates 17b may each have one or more aligned slots formed therethrough and the plate 17p may have one or more complementary holes formed therethrough. The bracket 17 may further include a fastener set 16 for each set of holes and slots. Each fastener set 16 may include a threaded bolt or screw, a threaded lock nut, and a washer.

To assemble and install the torsion clamp 10, the mandrel 12 may be screwed into the lower sensor sub 114b and the bypass sleeve 14 connected to the bypass tubing 108t. The splined sleeve 13 may then be oriented so that the plate 17p faces the bypass tubing 108t and the splined sleeve may then be inserted onto the mandrel 12. The stop 15 may then be screwed onto the mandrel 12 and secured. The splined sleeve 13 may then be longitudinally adjusted into alignment with the bypass sleeve 14, thereby aligning the holes with the slots. The fastener sets 16 may then be assembled through the holes and slots, thereby torsionally connecting the pump string 109 to the bypass string 108.

The torsion clamp 10 may prevent the bypass string 108 from becoming wrapped around the pump string 109 when deployed into the wellbore 105. During deployment, counter torque 118 may be applied to the bypass string 108 from turning the production string 101 to overcome a restriction in the wellbore, such as due to casing deflection, well bore orientation, transition from vertical well orientation to deviation build angles, and/or debris in the wellbore 105. If only a friction clamp were used, the counter torque 118 could cause relative rotation between the bypass string 108 and the pump string 109.

Advantageously, the torsion clamp 10 may eliminate wind up or rotation of the bypass string 108 when installing the downhole assembly 103 in the wellbore 105. The torsion clamp 10 may reduce potential of damage to the bypass string 108 which could prevent successful electric line or slick line operations through the bore of the bypass string 108. The torsion clamp 10 may allow for easier space out of the bypass tubing 108t during assembly of the bypass string 108. The torsion clamp 10 may allow for longitude related expansion of the pump string 109 and bypass string 108 when high temperature cycling of the installed equipment is experienced. The torsion clamp 10 may assist with weight loading transfer of the bypass string 108 caused by installation of an additional ESP to the bypass string 108.

Advantageously, the torsion clamp 10 may allow the reliable usage of wellbore packer systems below the pump string 109 by reducing the risk of bypass string wind up which could compromise the sealing integrity thereof. The torsion clamp 10 may enhance the ability to run more sophisticated completion equipment assembled as part of the bypass string 108 below the pump string by stabilizing any rotation of the bypass string.

Figure 4:
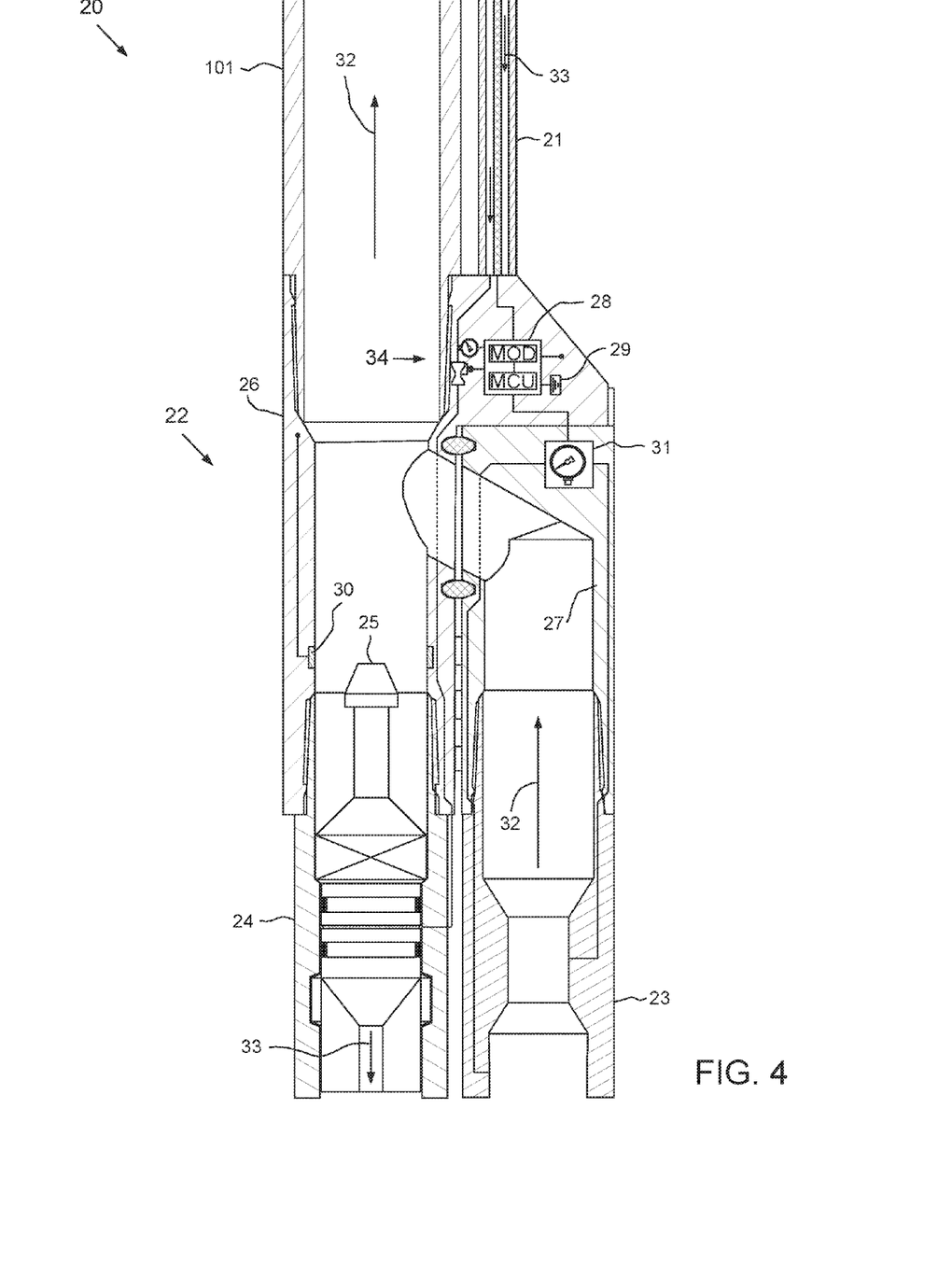
FIG. 4 illustrates another ALS, according to another embodiment of the present disclosure.

FIG. 4 illustrates another ALS, according to another embodiment of the present disclosure. The ALS may include the motor driver (not shown), the production string 101, the power cable (not shown), a downhole assembly 20, and a control line 21.

The downhole assembly 20 may include a Y-tool 22, a bypass string, and a pump string. The pump string may include a Venturi tube 23 extending from the Y-tool 22 to the productive zone, the ESP (not shown) connected to a bottom of the Venturi tube adjacent to the perforations (not shown), and a first portion of the torsion clamp (not shown) connected to a lower end of the ESP. The bypass string may include a landing nipple 24 extending from the Y-tool 22, an injector 25 fastened to the landing nipple, joints of tubing (not shown) and the second portion of the torsion clamp interconnected, such as by threaded couplings.

The Y-tool 22 may be similar to the Y-tool 1 except for the addition of one or more sensors and associated electronics. The Y-tool 22 may include a stem 26 and branch 27. The stem 26 may have a head for connection to a lower end of the control line 21. The control line 21 may extend from the motor driver at surface. The control line 21 may include an inner electric cable housed in an outer capillary tube. The inner electric cable may have an inner single electrical conductor isolated by an intermediate insulating jacket and protected by outer armor. An annulus may be formed between the cable and the capillary tube. An electronics package 28 may be housed in a cavity formed in an upper portion of the stem 26. The electronics package 28 may include a microcontroller (MCU) and a modem (MOD) in electrical communication with the MCU. The electronics package may receive electricity, such as a DC power signal, from the control line 21. The electronics package 28 may also be electrically connected to the stem 26 or cable armor for completing the circuit with the control line 21 by earth return 29 via the production string 101 or control line 21.

The MOD may facilitate digital data communication between the MCU and the motor driver, such as by modulating the data on a carrier signal, such as an AC signal. A proximity sensor 30 may be disposed in a groove formed in an inner surface of the stem 26 and be in electrical communication with the MCU via leads routed through the stem. The Venturi tube 23 may be tubular and have a threaded coupling formed at an upper end thereof for connection to the branch 27 threaded coupling and a flanged or threaded coupling formed at a lower end thereof for connection to the ESP. The Venturi tube 23 may have a measurement profile, such as a converging inlet, throat, and diverging outlet, formed in an inner surface thereof. A differential pressure sensor 31 may be housed in a cavity formed in an upper surface of the branch 27. The pressure sensor 31 may be in fluid communication with the inlet and throat of the Venturi tube 23 via pressure taps routed through the branch 27.

The pressure sensor 31 may be in electrical communication with the MCU via leads routed through the branch 27 and the stem 26. As the ESP operates and pumps the production fluid 32 through the Venturi tube, the MCU may receive differential pressure measurements from the sensor 31. The MCU may process the pressure measurements to determine a flow rate and then transmit the flow rate to the motor driver via the modem. Alternatively, the MCU may transmit the pressure measurements and the motor driver may determine the flow rate. The motor driver may utilize the flow rate to monitor and optimize the operation of the ESP (i.e., by changing speed of the ESP motor or adjusting a surface choke). The motor driver may also utilize the flow rate to monitor health of the ESP.

Additionally, for inclusion of a second ESP, a second Venturi tube may be connected to the stem 26. The flow rate measurements may then be used to allocate the flow from each ESP and to optimize production from both ESPs. Alternatively, a jumper cable may connect the electronics package 28 to the lower sensor sub (not shown) for electrical communication between the electronics package and the motor driver via the power cable.

The landing nipple 24 may have a landing profile formed in an inner surface for receiving the injector 25. The landing profile may include a shoulder, a seal bore, and a groove. The landing nipple 24 may further have a port formed through a wall thereof at the seal bore. The nipple port may be in fluid communication with the control line annulus via an injection passage routed through the stem 26. During operation of the ESP, a chemical, such as corrosion inhibitor 33, may be pumped from surface, down the control line annulus, and into the port. The inhibitor 33 may continue down the bypass string and be discharged therefrom adjacent to the perforations (not shown), thereby treating the production fluid 32 before intake to the ESP. The injector 25 may further have a plug located upstream of the port for closing the bypass bore and a fixed choke, such as an orifice, nozzle, or Venturi, located downstream of the port for regulating flow of the inhibitor 33.

The proximity sensor 30 may be capable of detecting presence of the injector 25 to verify accurate landing thereof in the nipple 24. During landing of the injector 25, the MCU may receive a detection signal from the proximity sensor 30 and report the presence to the surface via the MOD and control line cable. The injector 25 may further have a fishing neck for retrieval to the surface using a workline.

The Y-tool 22 may further include one or more sensors 34, such as a pressure sensor and/or a flow meter, in fluid communication with the injection passage. The sensors 34 may each be in electrical communication with the MCU and the MCU may send the measurements therefrom to the motor driver for monitoring injection of the inhibitor 33 and operation of the injector 25. Should either be suboptimal, an adjustment may be made from the surface (i.e., adjusting operation of the injection pump) or by retrieving and replacing the injector 25.

Additionally, the nipple 24 may include a differential pressure sensor (not shown) in fluid communication with an upper and lower portion thereof and in electrical communication with the MCU to ensure that the injector 25 is not leaking.

Alternatively, the injector 25 may be replaced by a variable choke valve or fixed choke for recirculation of a portion of the pumped production fluid 32. If variable, the choke valve may have an electric or hydraulic actuator. If electric, the actuator may be in communication with the MCU for adjustment thereof by command signal from the motor driver. If hydraulic, the actuator may be in fluid communication with the control line annulus via the injection passage for adjustment from surface. Alternatively, the injector 25 may include the variable choke instead of the fixed choke. Alternatively, the injector 25 may be replaced by a shutoff valve, such as a sleeve valve, having one of the actuators. Alternatively, the injector 25 may be replaced by a blanking plug, logging plug, or standing valve.

While the foregoing is directed to embodiments of the present disclosure, other and further embodiments of the disclosure may be devised without departing from the basic scope thereof, and the scope of the invention is determined by the claims that follow.

The invention claimed is:

1. A torsion clamp for use in a wellbore, comprising:
    a mandrel having:
        a coupling formed at each end thereof; and
        splines formed along an outer surface of the mandrel and extending between the couplings;
    a sleeve having splines formed in an inner surface thereof for meshing with the mandrel splines;
    a stop having a coupling for connection with one of the mandrel couplings;
    a bypass sleeve having couplings formed at each end thereof; and
    an adjustable bracket for connecting the bypass sleeve to the splined sleeve.

2. The torsion clamp of claim 1, wherein the couplings are threaded.

3. An artificial lift system (ALS) for use in a wellbore, comprising:
    the torsion clamp of claim 1; and
    an electric submersible pump (ESP) connected to the mandrel.

* * * * *